Vern W. Pugsley
Alphonso F. Barhorst
Richard H. Brown
INVENTORS

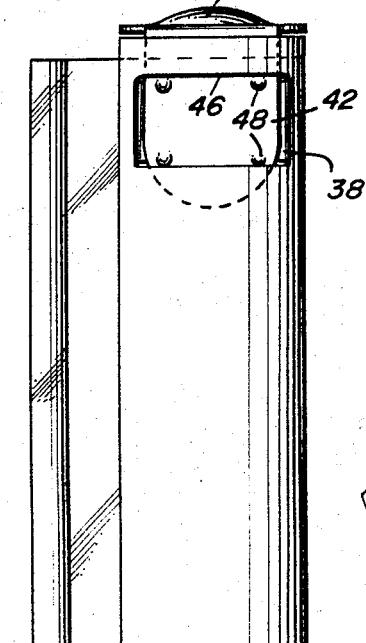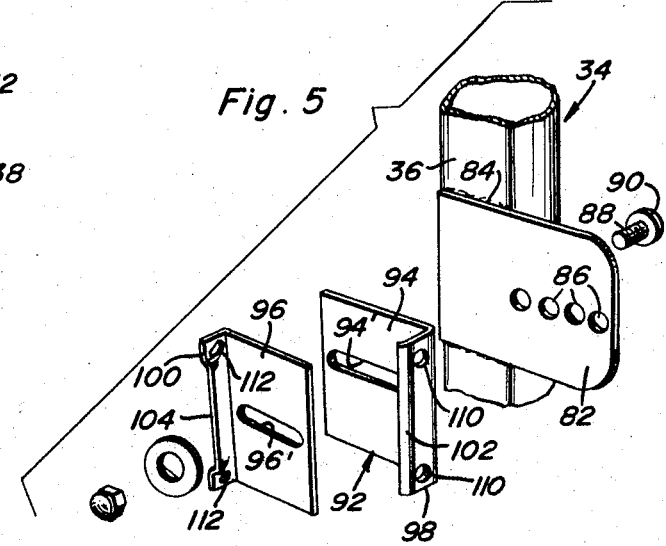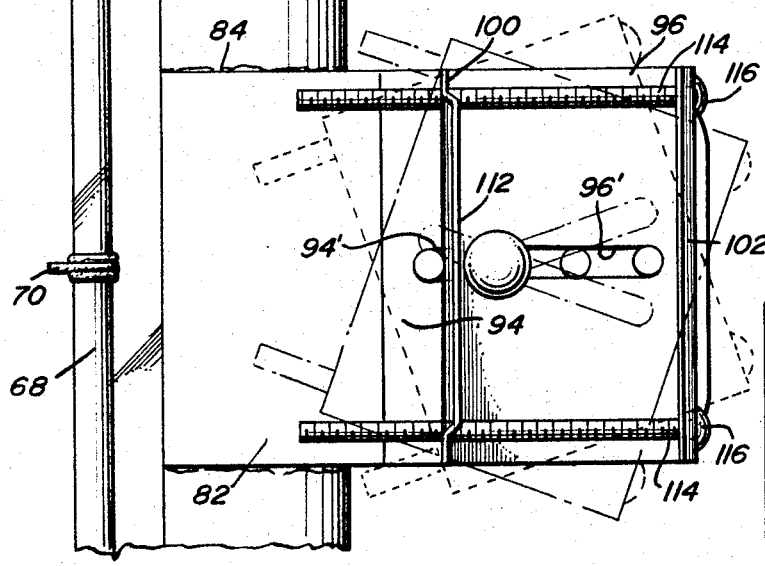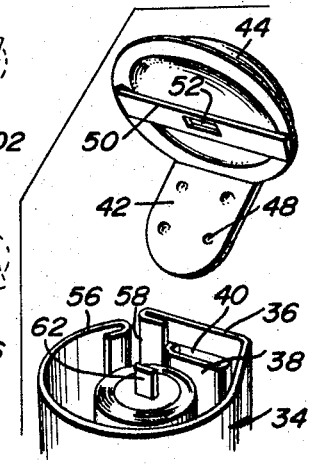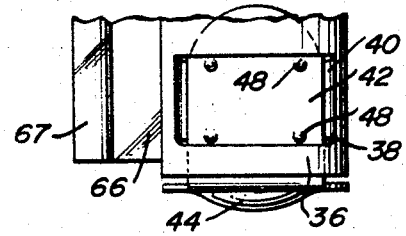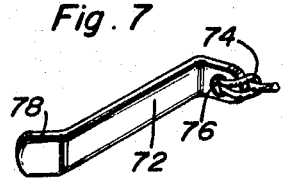

United States Patent Office
3,454,300
Patented July 8, 1969

3,454,300
RETRACTABLE WINDSHIELD COVER
Vern W. Pugsley, 716 Radcliffe Ave., Lima, Ohio 45804,
Alphonso F. Barhorst, Rte. 2, Anna, Ohio 45302, and
Richard H. Brown, 844 Primrose, Lima, Ohio 45805
Filed Nov. 15, 1967, Ser. No. 683,404
Int. Cl. B60j 1/20
U.S. Cl. 296—95                                         5 Claims

ABSTRACT OF THE DISCLOSURE

A horizontally extendible protective sheet for removable securement over the outer surface of a vehicle windshield and having one end wound upon a winding member or reel to be journaled from one side of the windshield together with means on its other free end adapted to be removably anchored to a portion of an associated vehicle body at the other side of the windshield.

---

This invention relates to a novel and useful retractable windshield cover assembly including a window shade-like sheet of suitable waterproof material having one end portion secured to a roller for winding thereon and provided with means at the other free end for attachment to one side of an associated vehicle adjacent the corresponding side of the windshield, the roller being journaled from suitable support means provided with mounting means adapted for removable securement to the other side of an associated vehicle.

The main object of this invention is to provide a windshield cover assembly that may be readily removably secured to one side of a vehicle body in a compact storage position and which may be readily extended across the windshield of the associated vehicle and removably secured to the other side of the vehicle.

Another object of this invention is to provide a retractable windshield cover assembly in accordance with the immediately preceding object and including a roller shade-type cover including an attractive housing adapted for removable securement to an associated vehicle and from which the protective sheet portion of the windshield cover assembly may be readily extended.

Still another object of this invention is to provide an apparatus in accordance with the immediately preceding object and including mounting means for the housing portion thereof angularly adjustable relative to the housing portion and thereby adapted to conform to use on various types of vehicles.

A still further object of this invention, in accordance with the immediately preceding object, is to provide mounting means for the housing of the windshield cover assembly in the form of adjustable clamp means whereby the housing may be readily removably secured to various vehicles.

A final object of this invention to be specifically enumerated herein is to provide a retractable windshield cover which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an elevational view of the windshield cover assembly with portions thereof being broken away and alternate adjusted positions of the mounting clamp assembly thereof illustrated in phantom lines;

FIGURE 5 is an exploded perspective view of the mounting clamp assembly including the portion thereof fixedly secured to the housing portion of the windshield cover assembly, portions of the housing being broken away;

Figure 1:
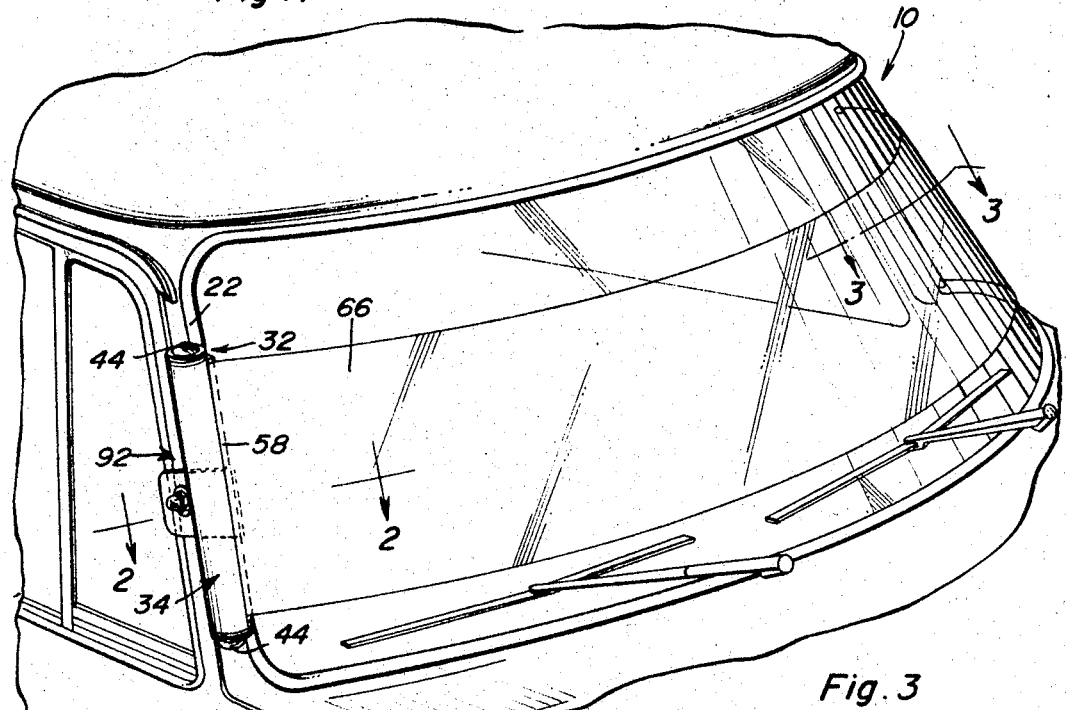
FIGURE 1 is a fragmentary perspective view of a conventional passenger vehicle with the retractable windshield cover of the instant invention mounted thereon in operative position to protect at least a major portion of the windshield of the vehicle.

FIGURE 6 is a fragmentary perspective view of one end of the housing portion of the cover assembly with the removable end plate thereof in exploded position; and FIGURE 7 is a perspective view of the attaching strap carried by the free end of the extendible sheet portion of the windshield cover assembly adapted to be utilized to secure the free end of the sheet portion to the corresponding side of an associated vehicle.

Referring now more specifically to the drawings the numeral 10 generally designates a conventional form of motor vehicle including a body assembly referred to in general by the reference numeral 12 provided with opposite side door openings 14 and 16 and a front windshield 18 with forwardly and downwardly inclined corner posts 20 and 22 disposed at the opposite sides of the windshield 18.

Right and left doors 24 and 26 are provided for the door openings 14 and 16, respectively, and hingedly supported from the body 12 in any convenient manner such as by hinge assemblies (not shown). Further, the windshield assembly 18 is supported from the body 12 by means of a resilient windshield molding 30 in which the opposite side portions of the windshield 18 are anchored and which are supported from the windshield corner posts 20 and 22.

The preceding description is of course to be considered as a description of any convenient conventional form of motor vehicle with which the cover assembly of the instant invention is to be used.

The cover assembly is generally referred to by the reference numeral 32 and includes an elongated tubular housing referred to in general by the reference numeral 34 whose opposite ends are open. One wall portion 36 of the housing 34 includes opposite end inwardly struck portions 38 defining a pair of longitudinally extending recesses 40 in which the tongue portions 42 of a pair of removable opposite end wall assemblies 44 are removably received, the inwardly struck portions 38 defining openings 46 at the opposite ends of the wall portion 36 into which dimpled portions 48 of the corresponding tongue portions 42 project. Each of the removable opposite end wall assemblies 44 is generally partially spherical in configuration throughout its center portion and defines an inwardly opening recess across which a transverse brace 50 is secured. One of the braces 50 is provided with a slot-type opening 52 and the other transverse brace is provided with a round bore-type opening (not shown.)

A wall portion 56 adjacent one side of the wall portion 36 has a longitudinal slot 58 formed therein and a roller shade-type roller 60 is disposed within the housing 34 and includes a flat tab portion 62 rotatably supported from one end and removably received in the opening 52 and an axle pin projection (not shown) journaled in the bore-type opening in the transverse brace at the other end of the housing 34 includes opposite end inwardly struck portions 60 is substantially the same as a conventional window shade roller having a torsion spring 64 connected between the tab portion 62 and the body of the roller. One end of a flexible sheet 66 is secured to the roller 60 for winding thereon and unwinding therefrom through the slot 58 and the free end of the sheet 60 has a hem 67 formed therein in which a rod-like reinforcing member 68 is disposed, a flexible tension member 70 having one end secured about the reinforcing member 68 centrally intermediate its opposite ends and through the hem 67 and its other end secured to one end of an elongated anchoring strip member 72 as at 74. The end of the strip member 72 to which the adjacent end of the tension member 70 is secured is angulated in one direction and suitably apertured as at 76 to receive the tension member 70 therethrough. In addition, the other end of the strip member 72 is oppositely angulated as at 78 so as to conform to the tortuositic slot 80 defined between the confronting portions of the corner post 20 and the left hand front door 26. In this manner, the strip member 72 may be anchored within the slot so as to secure the free end of the sheet 66 to the left side of the vehicle 10 adjacent the left hand margin of the windshield 18.

The wall portion 36 has one end of a generally tangentially outwardly projecting flange or base 82 secured thereto in any convenient manner such as by welding 84. The outwardly projecting free end of the flange 82 is provided with a plurality of longitudinally spaced apertures or openings 86 adapted to selectively receive therethrough the threaded shank portion 88 of a headed fastener 90.

A clamp assembly generally referred to by the reference numeral 92 is supported from the flange or base 82 and includes a pair of superposed plates 94 and 96 including registrable slots 94' and 96'. The plates 94 and 96 include opposing jaw-defining flange portions 98 and 100 and it may be seen that the outer free end of the flange portion 98 is angulated as at 102 and that the outer end of the flange portion 100 includes a central portion which is angulated as at 104. The angulated portions 102 and 104 converge toward each other and it may be seen that a threaded fastener 106 is secured on the threaded shank portion 88 after the latter is passed through one of the apertures or openings 86 and the slots 94' and 96'. In this manner, the clamp assembly 92 may be angularly adjusted relative to the flange or base 82 and also adjusted longitudinally of the latter.

The flange 98 has a pair of smooth bores 110 formed thertthrough and the flange portion 100 has a pair of threaded bores 112 formed therethrough. A plurality of elongated threaded fasteners 114 pass through the bores 110 and the ends of the fasteners 114 remote from the heads 116 thereof are threadedly engaged in the threaded apertures or bores 112. Thus, the fasteners 114 may be utilized to urge the flange portions 98 and 100 toward each other.

Figure 3:
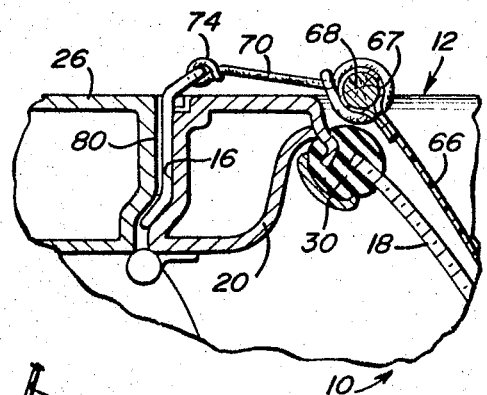
FIGURE 3 is an enlarged fragmentary horizontal sectional view taken substantially upon the plane indicated by the section line 3—3 of FIGURE 1.
Figure 2:
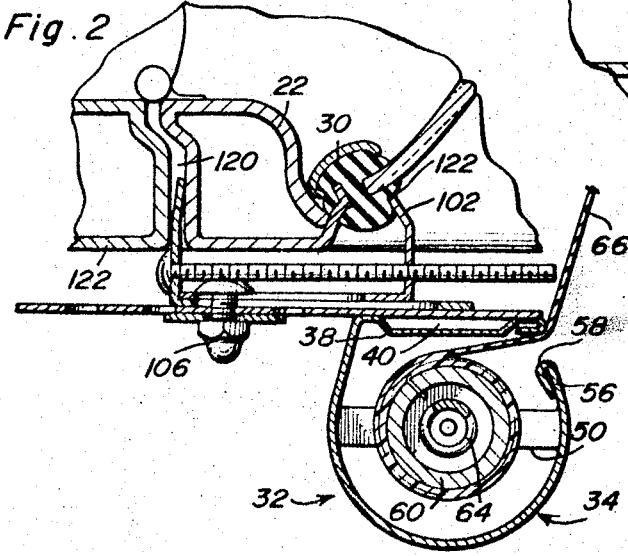
FIGURE 2 is an enlarged fragmentary horizontal sectional view taken substantially upon the plane indicated by the section line 2—2 of FIGURE 1.

In order to secure the windshield cover assembly 32 to the vehicle 10, the fastener 106 is first loosened and then the flange portions 98 and 100 may be engaged with the right hand portion of the molding 30 in the manner illustrated in FIGURE 2 of the drawings and inserted in the slot 120 defined between the windshield post 22 and the right hand door 122. Thereafter, the fasteners 114 may be utilized to draw the flange portions 98 and 100 toward each other so as to slightly inwardly deflect the molding 30 as at 124, see FIGURE 2. Thereafter, the fastener 106 may be securely tightened so as to secure the housing in adjusted rotated position relative to the clamp assembly 92 and the plates 94 and 96 carrying the jaw-defining flange portions 98 and 100 in adjusted relative positions. Thereafter, the strip member 72 may be grasped so as to pull the corresponding end of the sheet 66 from the housing 34 through the slot 58. After the free end of the sheet 66 has been pulled to the left hand side of the vehicle 10, the strip member 72 may be inserted in the slot 80 in the manner illustrated in FIGURE 3 of the drawings so as to anchor the free end of the sheet 66 to the left hand side of the vehicle 10. Of course, the sheet 66 may be of any suitable material and even of a material including some elastic properties whereby the sheet 66 may more readily conform to windshields including compound curves.

When it is desired to temporarily remove the sheet 66 from across the windshield 18, it is merely necessary to pull the strip member 72 outwardly of the slot 80 and to allow the spring 64 to wind the extended end portion of the sheet 66 on the roller 60. If inclement weather is expected in the near future, the housing 34 may remain attached to the right hand windshield post 22 by the clamp assembly 92 in readiness for further use of the sheet 66. However, if no inclement weather is expected in the near future, the cover assembly 32 may be readily removed from supporting engagement with the windshield post 22 by applying forces on the housing 34 or clamp assembly 92 toward the left as viewed in FIGURE 2 of the drawings so as to slightly further inwardly deflect the right hand portion of the molding 30 at 122 and thereby release the flange portion 98 from tight frictional engagement with the rear surface of the windshield post 22 in order that the flange portion 98 may be withdrawn from the slot 120 and the flange portion 100 may be subsequently moved out of engagement with the right hand portion of the molding 30. Then, should it become necessary to again attach the cover assembly 32 to the same vehicle 10, the attaching process may be readily accomplished merely by reversing the above related removal process, the flange portion 100 being first engaged with the right hand portion of the molding 30 and utilized to inwardly deflect the molding 30 as at 122 so as to enable the flange portion 98 to be inserted into the slot 120 in frictional engagement with the rear surface of the windshield post 22.

What is claimed as new is as follows:

1. A retractable windshield cover assembly for a vehicle, said assembly including base means, a retraction reel journaled from base means, a cover sheet connected at one end to said reel for retraction and extension of the other end, attaching means on said other end adapted for removable attachment to a vehicle body at one side of the windshield thereof, said base means comprising a mounting plate portion generally paralleling the axis of rotation of said reel and having an aperture formed through a portion thereof disposed to one side of said reel, a pair of jaw member plates disposed in superposed relation to each other and said mounting plate portion, said plates including laterally directed opposing and generally parallel flanges projecting outwardly from remote edge portions thereof and generally paralleling said axis, said plates having registered generally parallel elongated slots formed therethrough extending between said flanges and registered with said aperture, a threaded pivot fastener extending through and slidable in said slots and secured through said aperture, threaded bores formed through the opposite ends of one of said flanges and smooth bores formed through the opposite ends of the other of said flanges, and threaded shank-type fasteners extending through said smooth bores and threadedly engaged in said threaded bores, said fasteners including diametrically enlarged portions opposing the surface portions of the other of said flanges remote from said one flange and disposed about said smooth bores.

2. The combination of claim 1 including an elongated housing supported from said mounting plate and enclosing said reel, said housing including means defining a slot opening into said housing and through which said cover sheet may be extended and retracted.

3. The combination of claim 1 wherein said flanges include outer end portions which converge outwardly toward each other.

4. The combination of claim 1 wherein said attaching means comprises an elongated strip member carried by and projecting outwardly of said other end of said sheet adapted to be endwise inserted between the adjacent windshield corner post and the confronting forward edge portion of the associated vehicle door.

5. The combination of claim 1 wherein said mounting plate includes additional spaced apart apertures formed therethrough which, together with the first mentioned aperture, are spaced along a path extending transversely of said axis, said pivot fastener being alternately receivable through a predetermined aperture of said additional apertures.

References Cited

UNITED STATES PATENTS

| | | | |
|---|---|---|---|
| 2,530,478 | 11/1950 | Parent | 248—226 |
| 2,599,066 | 6/1952 | Osborn | 160—368 |
| 2,723,714 | 11/1955 | Moore | 296—95 |
| 2,851,303 | 9/1958 | McQueen | 160—368 |
| 3,014,755 | 12/1961 | Kennedy | 160—368 |

KENNETH H. BETTS, *Primary Examiner.*

L. D. MORRIS, JR., *Assistant Examiner.*

U.S. Cl. X.R.

160—368